United States Patent Office 3,319,121
Patented May 9, 1967

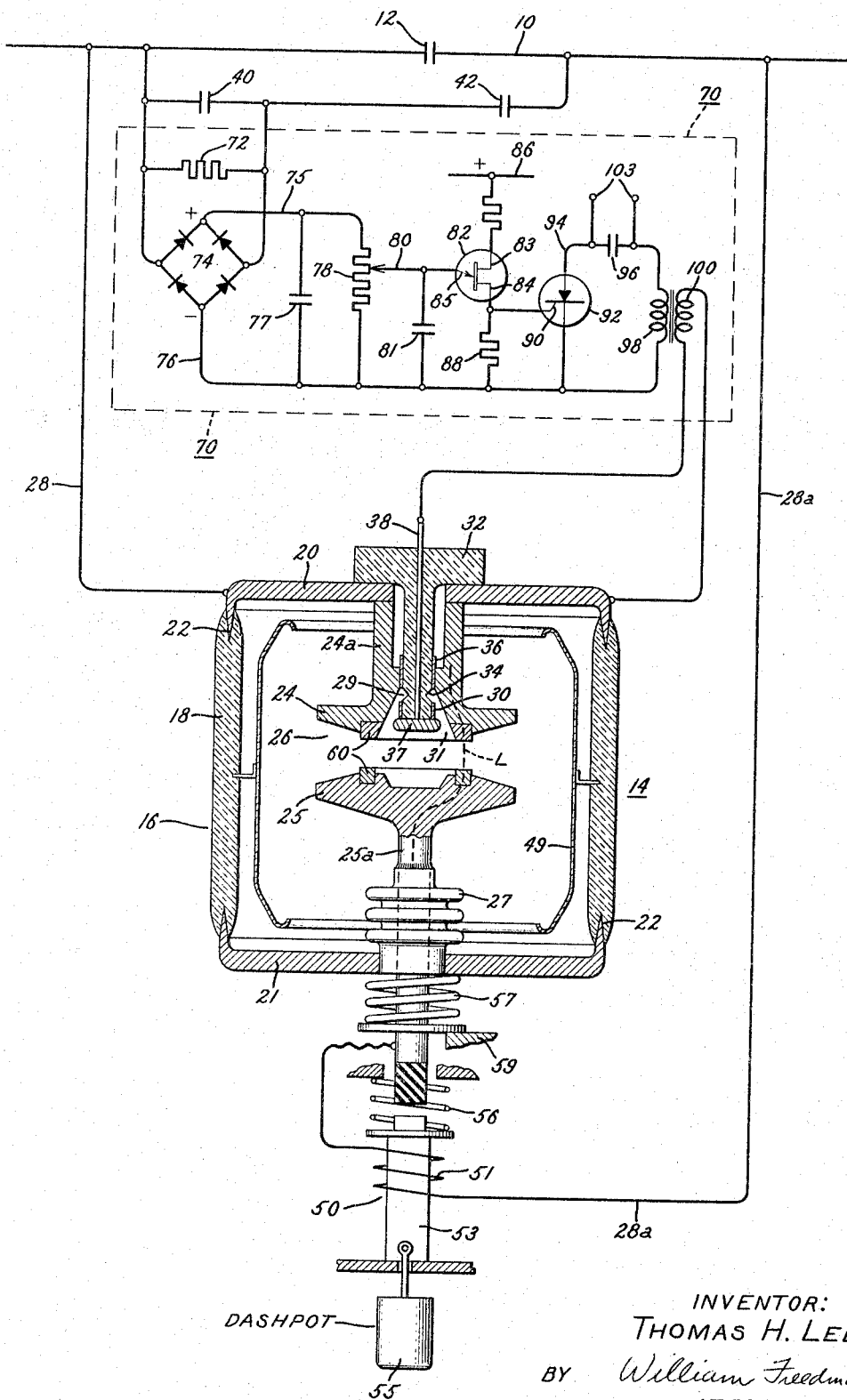

3,319,121
MEANS COMPRISING A TRIGGERED VACUUM CIRCUIT INTERRUPTER FOR PROTECTION AGAINST OVERVOLTAGES
Thoms H. Lee, Media, Pa., assignor to General Electric Company, a corporation of New York
Filed Mar. 8, 1965, Ser. No. 438,005
10 Claims. (Cl. 317—12)

This application is a continuation-in-part of my application S.N. 340,475, filed Jan. 27, 1964, now abandoned, and assigned to the assignee of the present invention.

This invention relates to means for protecting electrical apparatus against overvoltages resulting from the flow of excessive current through the apparatus and relates, more particularly, to means for protecting a series capacitor against such overvoltages.

Capacitors are sometimes connected in series with the high voltage transmission lines of a power system in order to increase the stability and power limits of the system. To protect these series capacitors from overvoltages resulting from the flow of excessive line-currents therethrough, it is customary to connect a normally non-conductive gap device in parallel with the series capacitor. If the line current should suddenly increase due to a fault on the power system, the voltage across the series capacitor will rise abruptly toward an excessive value. The gap device, however, is designed to break down before this voltage reaches a damaging value and, in so doing, to establish a low-impedance shunt circuit around the series capacitor through which the excessive current can flow without developing excessive voltage across the series capacitor.

When the fault responsible for the excessive current is isolated, as by the opening of a circuit breaker located between the fault and the power line, the line current returns to its normal value. It is important that the series capacitor be reinserted into the power line immediately after this fault-removal, as this is the time its presence is most needed for the purpose of maintaining stability of the power system.

Prior schemes for removing and later reinserting the capacitor in this manner have been most complicated and expensive. And even with all their complications, these prior schemes generally have not been as precise and quick in their operation as might be desired.

Accordingly, an object of my invention is to provide a protective arrangement for a series capacitor that is of a simple and inexpensive construction and can perform its intended capacitor-removal and reinsertion functions with precision and with the desired high speed.

Another object is to provide a protective arrangement which can be accurately calibrated for breakdown at the desired voltage and which will retain its calibration substantially unchanged after repeated operations.

In carrying out the invention in one form, I provide a gap device that comprises a pair of main electrodes that are adapted to be connected across the apparatus that is being protected. The gap device further comprises a highly evacuated envelope enclosing said main electrodes and evacuated to a pressure of $10^{-5}$ mm. of mercury or less. Means is provided for normally maintaining said electrodes in a spaced-apart position so as to define a main gap therebetween across which an electric field exists when said electrodes are connected across said apparatus. Means including a trigger gap within the evacuated envelope is provided for injecting a concentration of charged conduction carriers into said main gap in response to a predetermined voltage developing across said apparatus to cause an arc to be established between said main electrodes. Means is provided for forcing said main electrodes into engagement after a predetermined arcing period to extinguish said arc and permit current to continue flowing through the engaged electrodes. Means is also provided for separating said electrodes immediately after the current therethrough has subsided to a predetermined level.

For a better understanding of my invention, reference may be had to the following description taken in conjunction with the accompanying drawing, wherein the single figure is a partially schematic sectional view of apparatus embodying one form of my invention.

Referring now to the drawing, there is shown a high voltage alternating current transmission line 10 and a series capacitor 12 connected in series with the line 10. For protecting the series capacitor 12 from overvoltages that could result from the flow of excessive line current therethrough, a vacuum gap device 14 is connected in parallel with the series capacitor.

This vacuum gap device 14 comprises a sealed envelope 16 that is evacuated to a pressure of $10^{-5}$ mm. of mercury or lower. The envelope 16 comprises a casing 18 of a suitable insulating material, such as a ceramic, and a pair of metallic end caps 20 and 21 joined in vacuum tight relation to the respective opposite ends of the insulating casing 18 by suitable seals 22.

Located within the evacuated envelope 16 is a pair of main electrodes 24 and 25 that are normally spaced apart to define a main or primary gap 26 located therebetween. These electrodes are preferably of a disk-shape configuration. Electrode 24 is a stationary electrode which is supported on the upper end plate 20 by means of a tubular supporting rod 24a; whereas electrode 25 is a movable electrode which is joined to and carried by an elongated conductive operating rod 25a that projects through an opening in the lower end plate 21. A flexible metallic bellows 27 is provided about the operating rod 25a to permit vertical movement thereof without impairing the vacuum inside the evacuated envelope 16. This bellows 27 is secured by suitable seals at its respective opposite ends to the operating rod 25a and the end plate 21. A spring 57 external to the envelope 16 is provided for normally maintaining the lower electrode 25 in its illustrated fully-separated position. A suitable stop 59 determines this fully separated position.

Electrode 24 is electrically connected to one side of the series capacitor through a conductor 28, and the other electrode 25 is electrically connected to the other side of the series capacitor through a conductor 28a. Accordingly, when the power line 10 is energized, the voltage appearing across the series capacitor 12 also appears across the main gap 26.

When no current is flowing through the gap device 14, the voltage across the capacitor 12 and, hence, the gap 26, varies directly with the current flowing through the line 10 and capacitor 12. Should the current through capacitor 12 suddenly increase, for example, as a result of a fault on the power line 10, the voltage across capacitor 12 would rise toward an excessive value. This voltage is prevented from reaching an excessive value by causing the gap 26 to break down when a predetermined voltage is reached to establish a low impedance shunt path around the series capacitor for current flowing through line 10.

For causing the main gap 26 to break down when the voltage across the capacitor reaches a predetermined level, I provide a trigger gap 29 located within a centrally disposed recess 31 provided in the stationary electrode 24. This trigger gap 29 is preferably constructed in substantially the same manner as disclosed and claimed in U.S. Patent 3,087,092, Lafferty, assigned to the assignee of the present invention. Accordingly, it comprises a cylindrical ceramic support 32 located within the recess 31 and two thin layers 30 and 36 of metal bonded to the external surface of the ceramic support in spaced-apart relationship along the length of the support. These two layers of metal constitute the electrodes of the trigger gap. They are separated by a V-shaped groove 34 that extends about the circumference of the ceramic support and has its walls defined by the ceramic material itself. One of the trigger electrodes 36 is electrically connected to the main electrode 24. The other electrode 30 is normally electrically isolated from the main electrode 24.

These layers 30 and 36 are formed of a metal such as titanium, which is a good getter for active gases such as hydrogen and which is capable of absorbing a large quantity thereof. In a preferred form of my invention, each of these two layers of titanium is charged with a large quantity of hydrogen in the manner explained in the aforementioned Lafferty patent.

As is well known, the lines of field distribution at the interface between a metal and a ceramic body in intimate contact are highly favorable to a breakdown at such an interface. Accordingly, a relatively low voltage applied across the trigger gap can initiate a discharge from one of these interfaces across the trigger gap.

For applying a voltage across the trigger gap, a conducting lead 38 is provided extending through a passageway in the ceramic support 32. At its inner end, this lead 38 is brazed to a metallic cap 37 which is in electrical contact with the trigger electrode 30. The metallic cap 37 is hermetically sealed to the inner end of the ceramic support 32 by conventional metal-to-ceramic sealing techniques so as to maintain the hermetic seal of the envelope.

For applying a triggering pulse to the trigger gap 29 when the voltage appearing across the series capacitor 12 reaches a predetermined value, a suitable pulse-forming circuit schematically shown at 70 is provided. The input signal to this pulse-forming circuit is derived from a circuit shunting the series capacitor 12 that comprises the series combination of two voltage-dividing capacitors 40 and 42. The capacitance of capacitor 40 is large compared to that of capacitor 42 so that a relatively low voltage appears across capacitor 40. This voltage produces a small flow of current through a high ohmic resistor 72 connected across the terminals of capacitor 40. The voltage developed across the resistor 72 is rectified by a full wave rectifier 74 having its output terminals 75 and 76 connected across a smoothing capacitor 77. The voltage across smoothing capacitor 77 is a smoothed unidirectional signal voltage having an amplitude substantially proportional to the voltage across the series capacitor 12.

A voltage-dividing resistor 78 is connected across the smoothing capacitor 77, and a predetermined percentage of the signal voltage is developed between the adjustable resistor tap 80 and the lower terminal of the resistor 78. This voltage is applied to the terminals of a capacitor 81. Thus, the voltage across capacitor 81 is also proportional to the voltage across the series capacitor 12.

For firing the trigger gap 29 when the voltage across capacitor 81 reaches a predetermined level, a level detector 82 in the form of a silicon unijunction transistor is provided. This unijunction transistor 82 is of a conventional form, such as disclosed and claimed in U.S. Patent No. 2,769,926, Lesk, assigned to the assignee of the present invention, and it will therefore be explained only in sufficient detail to provide an understanding of the present invention. Referring now to the unijunction transistor 82, 83 and 84 represent the two bases of the transistor, and 85 represents the emitter of the transistor. The two bases 83 and 84 are connected across a source of voltage comprising a positive bus 86 and the negative conductor 76, between which a constant voltage is maintained. The details of this source are unimportant to the present invention and therefore are not shown in the drawing. So long as the voltage between the emitter 85 and the lower base 84 is below a certain critical value, called the peak point emitter voltage, a very high resistance is present between the emitter and the two bases, and therefore no significant amount of current flows in the circuit of emitter 85. However, when the emitter voltage is increased to this critical peak point emitter voltage, the transistor 82 fires, i.e., the resistance between its emitter 85 and base 84 suddenly drops, allowing greatly increased current to flow from the emitter 85 through the base 84. This greatly increased current is derived from the capacitor 81, which, in response to firing of the unijunction transistor 82, quickly discharges through the circuit including the emitter 85 and the base 84.

Connected in series circuit relationship with the lower base 84 is a resistor 88 across which a voltage is abruptly developed when current flows through the emitter-base circuit upon firing of the unijunction transistor 82. This voltage is applied to the gating electrode 90 of a silicon controlled rectifier 92, which responds by firing to complete a discharge circuit 94 for a previously-charged capacitor 96. Connected in this circuit 94 across the capacitor 96 is the primary winding 98 of a pulse transformer. The secondary winding 100 of this pulse transformer is connected across the trigger gap 29 of the triggered vacuum gap device 14 via parts 38 and 20 of the gap device. When the capacitor 96 discharges in response to firing of the silicon controlled rectifier 92, a voltage pulse is developed by the transformer across the trigger gap 29. This causes a breakdown, first, of the trigger gap 29 and then the main gap 26, as will soon be described.

The charging circuit for the precharged capacitor 96 is schematically shown at 103. This charging circuit is of a suitable conventional design that is capable of restoring the charge on the capacitor 96 to substantially its original level in a few milliseconds. Effective discharge of the capacitor 96 occurs in a few microseconds. Accordingly, the capacitor 96 is in readiness to produce the desired firing pulse on successive half cycles of power frequency current through the power line 10 should it be called upon to do so.

When normal currents are flowing through the series capacitor 12, the voltage across the voltage-dividing capacitor 40 will be insufficient to cause the pulse-forming circuit 70 to break down the trigger gap 29. But should the series capacitor current rise to a predetermined level in excess of normal current, customarily 200 percent of normal current, then sufficient voltage will be developed across voltage dividing capacitor 40 to cause the pulse-forming circuit 70 to operate, i.e., to supply a pulse that breaks down the trigger gap 29.

An arc is established across the trigger gap 29 by this breakdown; and this arc heats the titanium layers 30 and 36 to cause the evolution of a quantity of hydrogen gas from the hydrogen-charged layers of titanium. This hydrogen gas is ionized by the arc and the ionized hydrogen is rapidly propagated, or injected, into the main gap 26, thus drastically reducing its dielectric strength and causing it to break down in response to the voltage then prevailing between the main electrodes 24 and 25. The ionized hydrogen particles are referred to hereinafter as charged conduction carriers.

Main electrodes 24 and 25 are made of a non-refractory metal, such as copper, that is substantially free of all gaseous impurities and impurities which, upon decomposition, will produce gases. Accordingly, the arc that is established between the main electrodes evolves no appreciable quantity of non-condensable gases from the main electrodes. This greatly aids the main gap in recovering its dielectric strength immediately after a current zero is reached.

The arc across the main gap does vaporize metal from the main electrodes, but these are metallic vapors that can be readily condensed. For this purpose, a tubular metallic shield 49 is provided about the main gap 26 to intercept and condense the arc-generated metallic vapors as they are projected radially outward from the gap 26. This condensation of these metallic vapors occurs very rapidly, and this permits the gap to build-up it dielectric strength at a very high rate when the current zero point is reached.

The small quantity of hydrogen gas which is evolved from the trigger gap is either rapidly reabsorbed by the titanium layers 30, 36 or is gettered by the contact vapors from the main gap as they condense on the shield 49. Accordingly, no significant amount of this gas is present to interfere with recovery of the dielectric strength across the main gap 26 when the current zero point is reached.

When current zero is reached at the end of a half cycle of arcing current, dielectric strength can be built up across the main gap 26 at such a high rate that the breakdown voltage on the next half cycle of current is again determined by the trigger gap rather than the main gap.

The pulse-forming circuit 70 is capable of operating at a substantially constant input signal voltage even after repeated prior operations. More specifically, the pulse-forming circuit 70 operates to produce the above-described firing pulse whenever the voltage developed across smoothing capacitor 77 reaches the original operating level for which the pulse-forming circuit 70 was set. Thus, even after repeated half-cycles of arcing current through the gap device 14, the pulse-forming circuit 70 will operate at substantially the same voltage across the series capacitor 12 as was the case on initial operation.

During the interval extending from the time the arc is extinguished at current zero until the trigger gap 29 breaks down on the succeeding half cycle of current, the series capacitor 12 is effectively reinserted in the power line. It is effectively removed from the power line only when the trigger gap breaks down to arc-over the main gap. In other words, the series capacitor 12 is reinserted into the line at the beginning of each half cycle of current and will remain in the line if the current therethrough does not reach a high enough level to cause the pulse-forming circuit 70 to produce another breakdown of the trigger gap. Since the effective voltage at which the gap device 14 is caused to break down remains substantially unchanged despite numerous half cycles of arcing, it will be apparent that the gap device 14 is capable of reinserting the series capacitor with no substantial delay should the line-current return to normal. Thus, if a circuit breaker (not shown) is opened to isolate the fault responsible for the overcurrent from the power line, the series capacitor will be immediately available to maintain stability during the transients associated with circuit breaker opening. This immediate availability during this period is highly desirable because this is the period when the series capacitor is most needed to perform its intended function of maintaining stability.

To prevent the gap device 14 from being damaged or otherwise impaired by unduly prolonged arcing, I have provided means for driving the electrodes into engagement after a predetermined arcing period. In the disclosed embodiment, this means comprises a solenoid 50 having a coil 51 connected in series with the main electrodes 24, 25. When this coil 51 is energized, it drives the armature 53 of the solenoid upwardly. Initial upward movement of the aramture 53 is retarded by a suitable time delay device, such as a dashpot 55. The dashpot is so designed that after a predetermined time the armature 53 can continue on its upward travel free from restraint from the dashpot. During this continued upward travel the armature engages the operating rod 25a for the main electrode 25 and drives the main electrode 25 into engagement with the other electrode 24.

Driving the electrodes into engagement extinguishes any arc present across the main gap 26 and provides a solid conductive path through the gap device 14 for current bypassing the series capacitor. The gap device 14 will be held in this closed position so long as overcurrent continues flowing therethrough. But when the current is restored to its normal value or some other preselected value approximately normal, the solenoid armature 53 will quickly return to its normal position under the influence of a reset spring 56. This will allow the opening spring 57 to drive the main electrode 25 downwardly into its open position of FIG. 1 as will soon be explained in more detail. It is to be understood that the dashpot 55 is so designed that it does not retard downward movement of the armature 53.

As pointed out hereinabove the electrodes 24 and 25 are made of a material that is substantially free of gases and other contaminants. When clean metal parts such as these are forced into engagement while an arc is present therebetween, ideal conditions are present for producing a strong weld between the parts. To prevent the electrodes 24, 25 from significantly welding together when they are driven into engagement during this arcing period, I provide each electrode with a contact-making ring 60 that is formed of a weld-resistant metal, such as disclosed and claimed in application Ser. No. 286,176, Lafferty et al., June 3, 1963, and assigned to the assignee of the present invention. Examples of these metals are copper-bismuth and copper-lead mixtures.

These rings 60 are preferably of an annular configuration and are arranged coaxially with the longitudinal central axis of the electrodes. Each ring 60 is suitably brazed to the remainder of its corresponding electrode 24 or 25. When the movable electrode 25 engages the fixed electrode 24, engagement occurs only at these rings 60. Since there are no significant welds formed between the rings 60 when they engage, it will be apparent that the electrode 25 is free to move out of engagement with the electrode 24 as soon as the solenoid armature 53 drops out in response to restoration of current to its normal value. Although I prefer to use weld-resistant material for only the rings 60 in certain cases it may be desirable to form the entire electrode of the weld-resistant material.

When the fault responsible for the overcurrent is cleared, as by opening of a circuit breaker (not shown) between the power line 10 and the fault, the current through the gap device 14 immediately returns to its normal value. This permits the solenoid armature 53 to drop out, thus permitting the opening spring 57 to drive the movable electrode 25 downwardly out of engagement with the other electrode 24. The vacuum device 14 can easily interrupt the current that is then flowing on the first current zero following contact separation. Hence, the gap device reinserts the series capacitor into the power line very quickly following fault clearance so that the series capacitor is available to maintain stability during this crucial period.

An important advantage of my protective arrangement is that it can be accurately calibrated for breakdown at the desired voltage and will retain its calibration substantially unchanged after repeated operations. A significant factor contributing to this characteristic is that it is the trigger gap 29 rather than the main gap 26 that determines the breakdown voltage of the device. The trigger gap is normally substantially unstressed and will not break down until it receives a pulse from the triggering circuit 70. Since the triggering circuit 70 can consistently develop and apply this pulse when the voltage across the series capacitor reaches a predetermined value, it will be apparent that the trigger gap 29 can be consistently broken down when the voltage across the series capacitor 12 reaches the predetermined level.

The trigger gap 29 is able to remain intact despite many operations because the currents that flow thereacross when it breaks down are very low, at least in comparison to the vastly larger currents that flow between the main electrodes. The high current arcs that are formed between the main electrodes 24 and 25 may deeply erode these electrodes and change their surface roughness, but this does not affect the breakdown voltage of the overall arrangement since this is determined by the triggering circuit 70 and the trigger gap 29, both of which remain intact despite surface changes in the main electrodes.

To protect the trigger gap from the arc between the main electrodes, I form the main electrodes in such a manner that there is always a magnetic force present on the main arc to drive it radially outward toward the outer periphery of the main electrodes. This magnetic force acts on the main arc to rapidly move it into a region near the outer periphery of the main electrodes. Since the trigger gap is in a recess at the center of one of the electrodes, it is relatively remote and hidden from the main arc at the outer periphery and is thus protected from the effects of this arc.

The radially-outward acting magnetic force on the main arc results primarily from the radially-outward bowing loop-shaped configuration of the current path through the main arc, as is illustrated by the dotted line path L in the drawing. As is known, the magnetic effect of current flowing through a path of such configuration is to force the arc in a direction to lengthen the loop. This direction is radially outward in the illustrated device. When the main arc is initiated across the shortest portion of the main gap, this radially-outward magnetic effect becomes immediately available to drive the arc away from the center of the electrode.

In those circuit applications where particularly high currents are to be handled by the gap device, I provide each of the main electrodes with suitable arc-revolving means (not shown) for driving the arc at high speed about the outer circumferential portion of the main electrode. A preferred form of arc-revolving means comprises the spiral slots formed in the electrodes, as shown and claimed in U.S. Patent 2,949,520, Schneider, assigned to the assignee of the present invention. By moving the arc in this manner, the volume of arc-generated contact vapors can be reduced sufficiently to impart increased current-interrupting capacity to the device.

In certain circuit applications, it is not necessary that the series capacitor or other protected device be reinserted into the power circuit as soon after fault clearance as is possible with the arrangement shown in the drawing. In these circuit applications, the dashpot 55 can be omitted to enable the contacts to be driven closed by the solenoid 50 immediately upon breakdown of the main gap 26. When the current flowing through the solenoid coil 51 returns to a predetermined value approximating normal current, the contacts 24, 25 will be quickly separated to interrupt the circuit therethrough in the same manner as described hereinabove. My vacuum gap device is particularly suited for this type of operation because it can be closed within an exceptionally short time after the main gap breaks down. This greatly reduces the duration of the arcing period, thus prolonging the useful life of the device 14. There are several factors that contribute to the ability of the vacuum device 14 to close within an exceptionally short time. One is that the very high dielectric strength of the vacuum enables the gap 26 to be exceptionally short. Another is that the high interrupting efficiency of a vacuum interrupter permits its moving parts to be relatively small and light. Because only a small mass has to be moved through only a very short distance to effect closing, the closing operation can be completed very quickly.

While I have shown and described a particular embodiment of my invention, it will be obvious to those skilled in the art that various changes and modifications may be made without departing from my invention in its broader aspects, and I, therefore, intend in the appended claims to cover all such changes and modifications as fall within the true spirit and scope of my invention.

What I claim as new and desire to secure by Letters Patent of the United States is:

1. Means for protecting a capacitor that is connected in series with a power line from overvoltages resulting from excessive line current therethrough, comprising:
   (a) a pair of main electrodes that are adapted to be connected to said power line across said series capacitor,
   (b) a highly evacuated envelope enclosing said main electrodes and evacuated to a pressure of $10^{-5}$ mm. of mercury or less,
   (c) means for normally maintaining said electrodes in a spaced-apart position so as to define a main gap therebetween across which an electric field exists when said electrodes are connected across said series capacitor,
   (d) means including a trigger gap within said evacuated envelope for injecting a concentration of charged conduction carriers into said main gap in response to a predetermined voltage developing across said series capacitor to cause an arc to be established between said main electrodes,
   (e) electroresponsive means operable while said arc is present for forcing said main electrodes into engagement after a predetermined arcing period to extinguish said arc and permit current to continue flowing through the engaged electrodes,
   (f) means for separating said electrodes immediately after the current therethrough has subsided to a predetermined level.

2. The apparatus of claim 1 in which said means for injecting a concentration of charged conduction carriers comprises:
   (a) a ceramic body having a surface along which said trigger gap is located,
   (b) a layer of metal contacting said ceramic body at one edge of said trigger gap and constituting a trigger electrode,
   (c) said layer of metal being charged with a quantity of hydrogen gas, a portion of which is evolved and ionized upon breakdown of said trigger gap to form said charged conduction carriers.

3. The apparatus of claim 1 in combination with time delay means for delaying movement of said electrodes into engagement for a predetermined period after arcing is initiated, said time delay means rendering said electroresponsive means ineffective to produce engagement of said main electrodes should said excessive line current cease prior to expiration of said predetermined period.

4. The apparatus of claim 1 in which said electroresponsive means for forcing said contacts into engagement operates immediately upon establishment of said arc between said main electrodes.

5. A vacuum-type circuit interrupter comprising:
   (a) a highly evacuated envelope having a normal pressure therein of $10^{-5}$ mm. of mercury or less,
   (b) a first electrode within said evacuated envelope,
   (c) a second electrode within said evacuated envelope that is movable from a position of engagement with said first electrode to a position of disengagement to form a primary gap between said electrodes,
   (b) means including a trigger gap within said evacuated envelope for injecting a concentration of charged conduction carriers into said primary gap in response to a predetermined voltage being applied across said trigger gap to produce a sparkover of said trigger gap, thereby causing an arc to be established between said main electrodes,
   (e) and electroresponsive means operable while an arc is present between said main electrodes for transmitting motion to said second electrode to produce engagement and disengagement thereof with said first electrode.

6. The circuit interrupter of claim 5 in which said means for injecting a concentration of charged conduction carriers comprises:
   (a) a ceramic body having a surface along which said trigger gap is located,
   (b) a layer of metal contacting said ceramic body at one edge of said trigger gap and constituting a trigger electrode, (c) said layer of metal being charged with a quantity of hydrogen gas, a portion of which is evolved and ionized upon breakdown of said trigger gap to form said charged conduction carriers.

7. A vacuum-type electric circuit interrupter comprising:
   (a) a highly evacuated envelope having a static pressure of $10^{-5}$ mm. of mercury or less,
   (b) a first electrode within said evacuated envelope,
   (c) a second electrode within said envelope that is movable from a position of engagement with said first electrode to a position of disengagement to form a primary gap between said electrodes,
   (d) one of said electrodes containing a centrally located recess,
   (e) means including a trigger gap located within said evacuated envelope in said centrally located recess for injecting a concentration of charged conduction carriers into said primary gap in response to a pretermined voltage being applied across said trigger gap to cause an arc to be established between said electrodes,
   (f) and magnetic means for immediately forcing substantially all high current arcs initiated across said main gap radially outward away from said trigger gap.

8. The vacuum-type circuit interrupter of claim 7 in which said magnetic means comprises means for forcing the current flowing through an arc initiated across the shortest portion of said primary gap to follow a radially outwardly bowing path in the region of said arc.

9. The circuit interrupter of claim 5 in combination with means for applying said predetermined voltage to said trigger gap when the voltage across said primary gap reaches a predetermined value.

10. The circuit interrupter of claim 5 in combination with means for applying said predetermined voltage to said trigger gap when the voltage across said primary gap reaches a predetermined value, comprising:
   (a) a voltage divider connected across said primary gap and comprising series-connected capacitors,
   (b) a trigger circuit comprising said trigger gap and connected across one of said capacitors.

References Cited by the Examiner
UNITED STATES PATENTS

| | | | |
|---|---|---|---|
| 2,363,898 | 11/1944 | Partington | 317—12 |
| 2,664,525 | 12/1953 | Diebold | 317—12 |
| 3,087,092 | 4/1963 | Lafferty | 313—187 X |
| 3,093,767 | 6/1963 | Lafferty | 315—330 X |
| 3,188,514 | 6/1965 | Cobine | 315—330 X |
| 3,229,145 | 1/1966 | Jensen. | |
| 3,249,813 | 5/1966 | Price et al. | 317—12 |
| 3,252,050 | 5/1966 | Lee | 317—11 |

OTHER REFERENCES

Notes on the Application of the Silicon Controlled Rectifier, General Electric Co., December 1959, p. 54.

References Cited by the Applicant
UNITED STATES PATENTS

| | | |
|---|---|---|
| 2,323,702 | 7/1943 | Berkey. |
| 2,345,590 | 4/1944 | Evans et al. |
| 2,351,989 | 6/1944 | Marbury. |
| 2,370,082 | 2/1945 | Slepian et al. |

MILTON O. HIRSHFIELD, *Primary Examiner.*

R. V. LUPO, *Assistant Examiner.*